United States Patent [19]
Ferrato

[11] Patent Number: 5,704,668
[45] Date of Patent: Jan. 6, 1998

[54] REMOTE AND FAST-ACTING FASTENING AND RELEASE DEVICE

[76] Inventor: Gerard Ferrato, La Visionnerie - Le Grand Gour, 13500 Martigues, France

[21] Appl. No.: 537,731
[22] PCT Filed: Mar. 31, 1994
[86] PCT No.: PCT/FR94/00367
   § 371 Date: Oct. 13, 1995
   § 102(e) Date: Oct. 13, 1995
[87] PCT Pub. No.: WO94/24458
   PCT Pub. Date: Oct. 27, 1994

[30] Foreign Application Priority Data

Apr. 13, 1993 [FR] France .................. 93 04590

[51] Int. Cl.[6] .............................. B63B 21/54; B66C 1/36
[52] U.S. Cl. .......................... 294/19.1; 294/82.33
[58] Field of Search ...................... 294/19.1, 82.27, 294/82.3, 82.31, 82.33, 82.34; 24/599.1, 599.4, 599.5, 600.1, 601.5; 114/221 R, 230

[56] References Cited

U.S. PATENT DOCUMENTS

| | | | |
|---|---|---|---|
| 845,693 | 2/1907 | Coats et al. | 294/82.33 |
| 905,576 | 12/1908 | Porter | 294/82.33 |
| 958,978 | 5/1910 | Spencer | 294/82.33 |
| 1,215,046 | 2/1917 | Montgomery | 294/82.33 |
| 1,333,511 | 3/1920 | Small | 294/82.33 |
| 2,341,876 | 2/1944 | Masterson | 294/82.33 |
| 2,429,769 | 10/1947 | Petouhoff | 294/82.33 |
| 3,913,515 | 10/1975 | Hernsjo et al. | 294/19.1 |
| 3,938,844 | 2/1976 | Johnson | 294/82.33 |

FOREIGN PATENT DOCUMENTS

| | | | |
|---|---|---|---|
| 0081844 | 6/1983 | European Pat. Off. | |
| 2585664 | 2/1987 | France | |
| 2606732 | 5/1988 | France | |
| 234962 | 5/1911 | Germany | |
| 698825 | 11/1940 | Germany | |
| 50359 | 3/1932 | Norway | 294/82.33 |
| 820109 | 9/1959 | United Kingdom | |
| 8905413 | 6/1989 | WIPO | |

*Primary Examiner*—Johnny D. Cherry
*Attorney, Agent, or Firm*—Dvorak & Orum

[57] ABSTRACT

The present invention relates to a remote and fast-acting fastening and release device. The device comprises a hook suitable for engaging any moving part to which the device is fastened and released, together with a traction ring that receives a link element on which it must be possible to exert a traction force in any direction. The hook is mounted to move about an axis perpendicular to the traction direction and secured to one end of a carrier element that carries the traction ring which is situated at the opposite end of the carrier element. The courier element includes a moving locking means that holds the mooring hook substantially stationary against rotation in such a manner that said hook is and remains in its position for fastening to and applying traction to the mooring part.

5 Claims, 4 Drawing Sheets

REMOTE AND FAST-ACTING FASTENING AND RELEASE DEVICE

DESCRIPTION

The present invention relates to a remote and fast-acting fastening and release device.

The technical sector of the invention is the field of manufacturing systems for providing linking and mooring between two points that are to be connected together, at least one of the two points being a moving point.

One of the main applications of the invention is mooring boats to a ring provided for that purpose, which ring may be secured or fixed on a buoy, a mooring buoy, a quay, another boat, etc. . . .

Various devices are known enabling such links or moorings to be made for boats, however they are also known in other fields, such as railways, goods-handling, mountain climbing, etc. . . .

By way of example, various patent applications may be mentioned that deal with such devices, such as:

French patent application FR 2 606 732 published on May 20, 1988, in the names of Berenger and Mouysset, entitled "Fastening and/or release device mounted at the end of a mooring-carrying boathook pole for mooring a mooring buoy or a ring". That device essentially comprises a standard snap-hook arrangement enabling opening and closing thereof.

French patent application FR 2 585 664 published on Feb. 6, 1987 and filed by Mr. Boucheron, entitled "Safety boathook for mooring on an anchor buoy under remote control" which describes a system equivalent to the preceding system, French patent application FR 2 505 433 published on Nov. 12, 1982 filed by Mr. Orighoni and entitled "A device for fast-acting and safe mooring of a cable, e.g. a mooring for a boat", which describes a system integrated in a hook comprising a fixed portion and a moving portion, which portions are linked together by locking means, and the system further including members for operating it at a distance from the hook.

European application EP 390 834 published on Oct. 10, 1990, filed by Grassi and Ronchi under Italian priority and entitled "A fast-acting stop clamp whose clamping force is a direct function of load, for use with cables for suspending weights, . . . ", or indeed European application EP 81 844 published on Jun. 22, 1983 and filed under American priority by B. F. Goodrich Company, and entitled "A set of hooks with automatic closing and release".

All of those systems and devices set out to be suitable for remote and fast-acting fastening and release in certain applications, however they are generally too fragile and not suitable for taking up large forces, or else they are complicated to use and therefore require very special skill in order to enable them to be engaged; some of them are adapted to applications that are highly specific, such as holding under a load, and do not enable fastening to be achieved since they open whenever the load is relaxed, and that happens often when the load is a moored boat, in which case it would be dangerous.

Mention may also be made of fast-opening snap-hooks and other devices that require direct manual intervention by an operator in order to be put into place, which goes against the object of the present invention.

The problem posed is to be able to fasten any link element, e.g. a boat mooring, to a mooring part such as the ring on a buoy, with this being done remotely from the mooring part, at a distance is not stable, e.g. from the deck of a boat that is under way, thus requiring fastening to be performed accurately and quickly by means of an approach and grasping movement that is simple so as to make it possible to avoid re-starting the operation too often; once fastening has been achieved, the device must ensure a safe mooring by taking up any traction force that may be applied to said mooring, e.g. because of forces being applied to said boat by the wind, by the current, and/or by its own motor, which traction forces must be capable of being taken up by said mooring part; in addition, it must be possible rapidly to release said device carrying the element for linking to said mooring part without any risk of jamming, and whenever so desired, e.g. for the purpose of leaving a mooring quickly, in particular when the boat in question is subject to rough weather and is not fully in control of its own movement: it must be possible to let go the mooring whether it is under tension or not, and at some distance from the said mooring part, which distance is not stable, and this must be possible without any risk of jamming since that would require subsequent manual intervention.

One solution to the problem posed is a remote and fast-acting fastening and release device comprising a hook suitable for engaging any mooring part to which the device is to be fastened and released, together with a traction ring that receives a link element on which it must be possible to exert a traction force in any direction; said hook is mounted to move about an axis perpendicular to the traction direction and secured to one end of a carrier element that carries the traction ring which is situated at the opposite end of said carrier element, which carrier element includes a moving locking means that holds the mooring hook substantially stationary against rotation in such a manner that said hook is and remains in its position for fastening to and applying traction to the mooring part. In one embodiment, said moving means includes a cylindrically-shaped main element held against and guided in displacement along the central elongate body of the carrier element, and an abutment-forming retaining finger extending perpendicularly to the main element; in which case the mooring hook includes a securing member constituted by a part that is itself hook-shaped, being secured to that end of the mooring hook which comes against the central body of the carrier element in the locking position, and which projects in said position thereof so as to enable the finger to engage therein.

In another embodiment in which the mooring hook does not include a securing member, the moving locking means is hinged on the traction ring or on any support secured thereto and includes an abutment bearing directly against the end of the hook which it secures in the locking position; this moving means is then disposed on the same side of the central body of the carrier element as said hook, and it includes a clevis secured to said abutment and itself bearing against a part for stopping the carrier element.

In order to enable the device of the invention to perform fastening remotely, it may be associated with a boathook pole that is removable, having an end which includes a notch for securing the thrust abutment of the fastening hook and which can be locked relative to the carrier element of the hook by pulling on the link member so as then to be able to present said hook in a good position for fastening purposes.

Likewise, in order to enable release to be performed remotely in a manner that is as simple as possible, said moving means of the invention may include a resilient element and a part for fixing a release member adjacent to the traction ring; which release member, when subjected to traction, makes it possible to disengage the abutment for retaining the end of the moving fastening hook, and on being released makes it possible for said abutment to be returned into its locking position by said resilient element.

The result is novel remote and fast-acting fastening and release devices which provide an answer to the problem posed and to the above-mentioned drawbacks of existing systems.

In the main above-mentioned application of mooring a boat, it is thus possible, for example, to stand on the deck of the boat close to the stem thereof while holding both the mooring which is to be connected, and the end of the boathook pole, with the other end of the pole carrying the hook which is held against the carrier element and which is kept safe by the securing notch of the boathook pole; this notch bears against the retaining abutment and therefore prevents any wrong operation and risk of the hook opening; said carrier element is connected to one end of the mooring which is to be fixed and whose other end naturally remains on the boat.

By using the boathook pole to manipulate the device of the invention in the same manner as any conventional boathook, the operator can then engage the mooring hook of the device quite easily in the ring to which it is to be fastened, and then by removing the pole, the operator ensures the boat is securely moored by pulling on the mooring.

Any conventional type of tilting or resilient element that moves out of the way during fastening can be used to ensure that the hook closes so as to remain fastened to the mooring part, even if the tension on the mooring is released.

When it is desired to unhook the device, it suffices to apply traction to the release member which can be placed safely along the mooring or the link element, and which is therefore recovered together therewith: said release member then makes it possible when traction is applied thereto to release the abutment retaining the end of the moving mooring hook which had previously been secured by said abutment, with the hook opening under the effect of the various moments due to the forces involved and as defined below: the device then immediately releases the mooring part and enables the ship to leave its location.

All of the above operations can be performed in complete safety and with a minimum amount of knowledge and skill when using the device of the invention: it is also very simple to manufacture, by assembling various mechanical parts which are themselves easy to make by forging, cutting, machining, and/or welding, and some of which are commercially available.

Other advantages of the present invention could also be mentioned, however those mentioned above already suffice in showing the novelty and the advantage of the invention.

The following description and figures relate to two embodiments of the invention, but the invention is not in any way limited thereto: other embodiments are possible in the ambit of the scope and the extent of the present invention, in particular by changing various basic shapes for the different elements of the device enabling the same functions to be performed.

Figure 1:
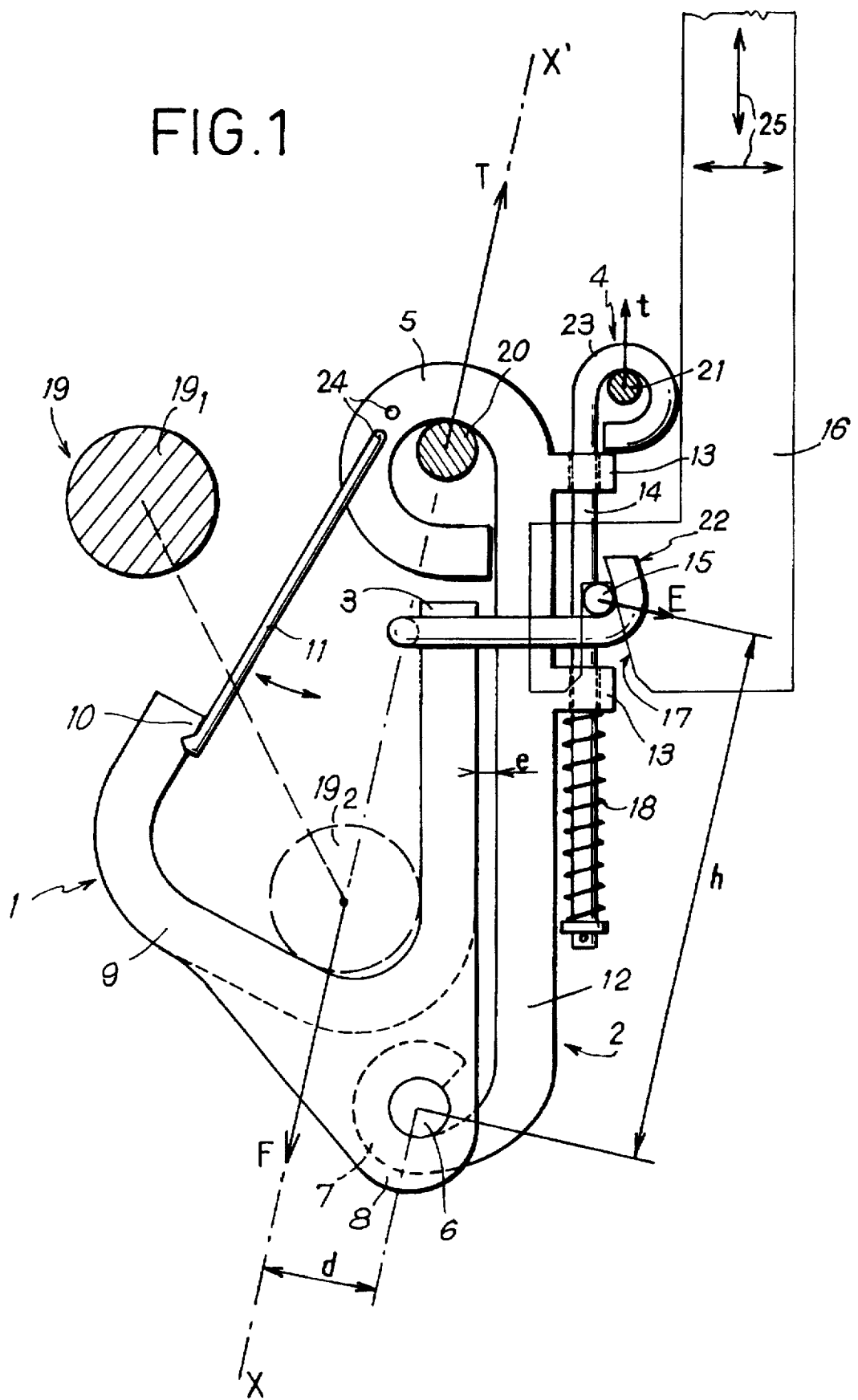
FIG. 1 is a profile view of an embodiment of the device of the invention in the fastened position.
Figure 2:
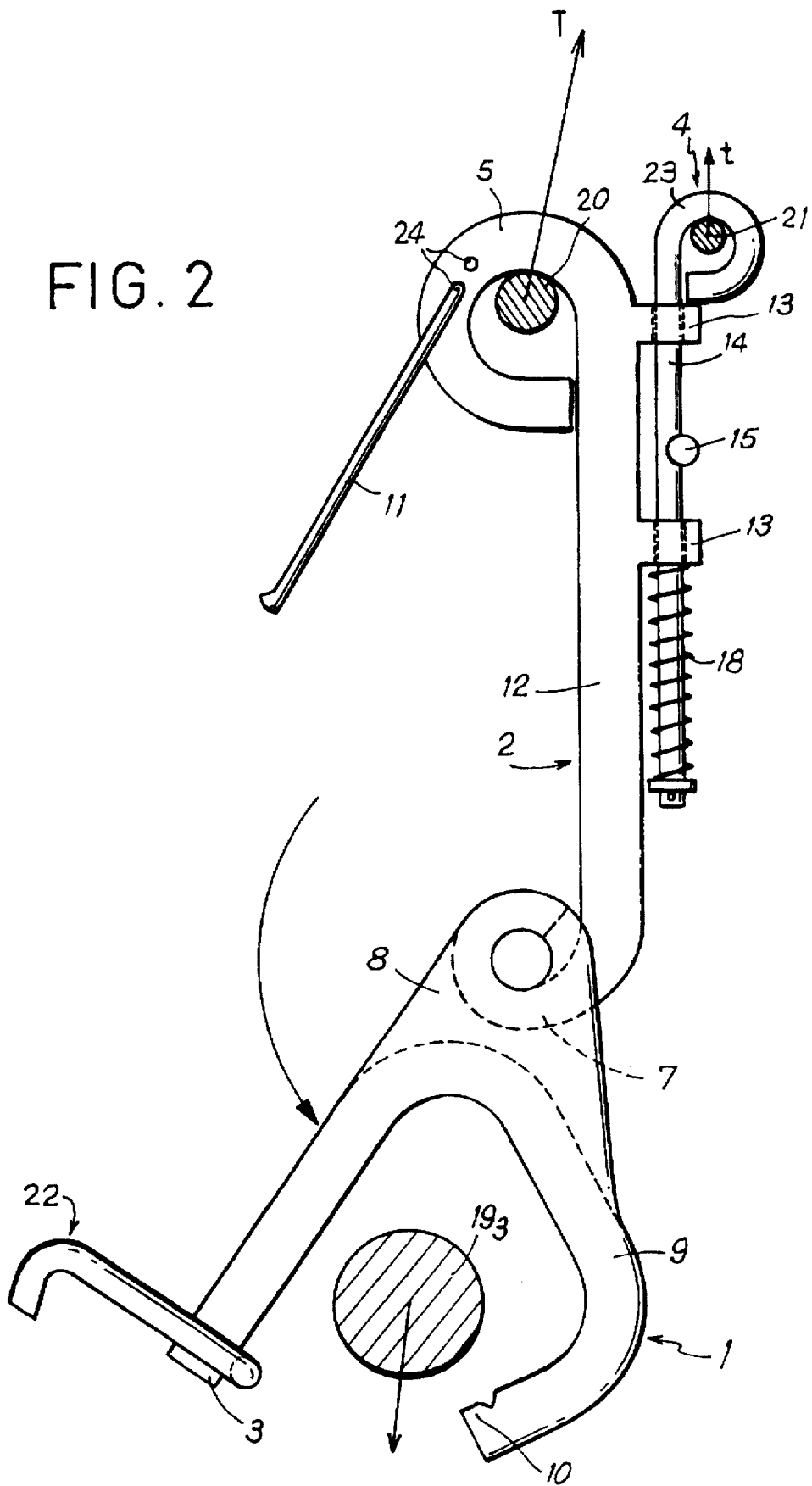
FIG. 2 is a profile view of the same device as in FIG. 1, but in its release position.
Figure 3:
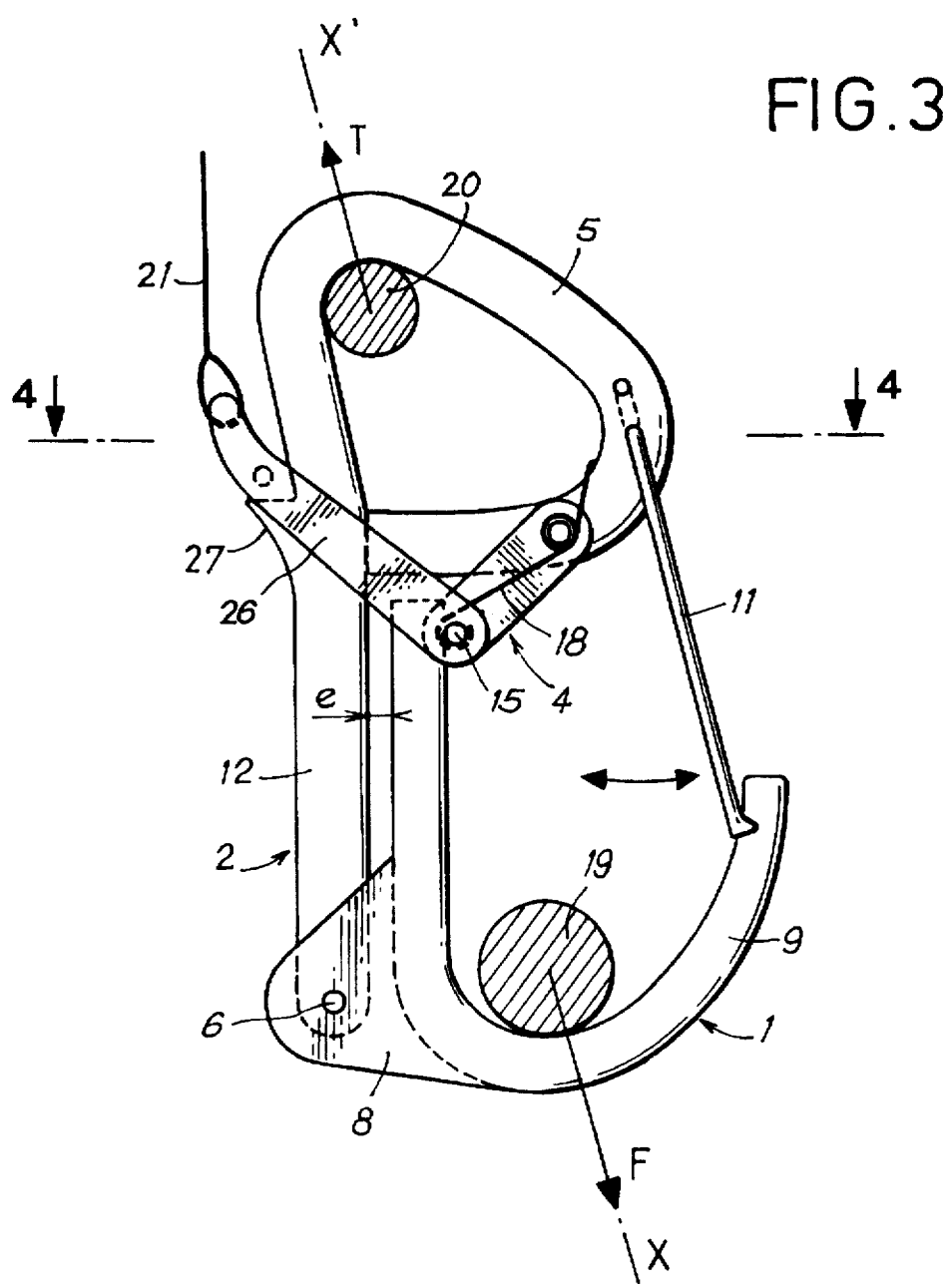
FIG. 3 is a profile view of another embodiment of the device of the invention in its fastened position.

In conventional manner, the devices as shown in FIGS. 1 to 3 comprise a hook 1 enabling any mooring part 19 (such as the ring on a buoy in the main application to a boat) onto which the device is to fasten and release, together with a traction ring 5 that receives some kind of link element 20, such as the mooring line of said boat, and on which a traction force T can be exerted in any direction xx', and in particular the direction to a mooring point secured to the boat, for example.

In FIG. 1, said mooring part 19 is shown firstly in a position 31 independent of the device of the invention, and secondly in a position 32 after it has been engaged in the hook 1, thereby enabling traction T to be taken up by transmission of the reaction force F on the mooring part proper.

In FIG. 2, the same mooring part 19 is shown in its position 33 while it is being let go, and thus while it is becoming disengaged from the device of the invention.

In the explanations above and in the present description, we naturally refer to the main application of mooring a vessel, however it is clear that any device of the invention can also be used in other fields of application, optionally using different shapes and dispositions for the various parts constituting the device.

In all embodiments of the device, one of its main characteristics is that said hook 1 is mounted to move about an axis 6 that is substantially perpendicular to the direction xx' of the traction T applied by the link element 20 such as a mooring, the axis 6 being secured to one end of a carrier element 2 for the traction ring 5 which is situated at the other end of the carrier element from the said axis 6. The carrier element 2 includes moving locking means 4 that hold the hook 1 in place, and more particularly that substantially prevent the end 3 thereof from rotating so that said hook lies in and remains in its position for fastening and applying traction to the part 19.

The hook 1 comprises a curved main body 9 having one end that is closed in the fastening position by a tilting element 11 which is fixed at one end only to the traction ring 5, and that enables the hook 1 to be opened by allowing its other end to tilt; the other end 3 of the mooring hook 1 which comes against the central body 12 of the carrier element 2 when it is in its locking position is held stationary by an abutment 15 of said moving means 4. In addition, the hook 1 includes a supporting fork 8 secured to its main body 9 and carrying said axis 6 enabling the hook to rotate relative to the carrier element 2: said supporting fork 8 may be constituted by two plates or cheeks fixed on either side of the body 9.

The tilting element 11 may be a resilient element such as a metal wire curved into a hairpin shape, with its two curved-together ends engaging in two holes 24 that are offset and made in the traction ring 5; in conventional manner, such an offset ensures that the resilient element 11 is always returned to the plane of the two holes 24 after said resilient element 11 has been pushed aside to cause it to tilt, as when fastening the hook 1 by passing it around the mooring part 31: when the part presses against the resilient element 11, it tilts out of the way and then closes again after the part 19 has gone past, thereby leaving the part free to engage in the end of the hook 1 so as to take up the traction T.

The end of the hook 1 which is thus closed by the resilient element 11 may include a catch 10 for holding said resilient element 11 in its closed position and ensuring there is no danger of the element 11 being opened, e.g. by rubbing against the mooring part 19 in the event of the traction T being released. Also, the thrust of said resilient element 11 against the end of the hook 1 serves to keep it with maximum thrust against the retaining abutment 15, thereby compensating for any slack in the hinge and the assembly, such as the necessary and/or desired clearance "e" between the hook 1 and the central body 12 of the carrier element 2.

In the embodiment of FIGS. 1 and 2, the central body 12 of the carrier element 2 that has the said end 3 of the hook 1 secured against one side thereof when the hook is in its fastening position, carries said moving means 4 on its side remote from the hook 1; said end 3 of the hook 1 carries a locking member 22 that, in the locking position, passes over to the same side of the body 12 of the carrier element as said moving means 4 and co-operates with an abutment 15 thereon to lock the hook 1 and hold it in place.

To achieve simple release of said carrier element 2, it may be constituted by a single metal rod of substantially circular section with a rectilinear middle portion constituting an elongate central body 12, and having one end curved to form the traction hook 5 while its other end 7 carries the axis 6 on which the hook 1 rotates; for this purpose, the end 7 may likewise be curved like a pistol-grip, as shown in FIGS. 1 and 2, or else it may be pierced as shown in FIG. 3.

In the embodiment of FIGS. 1 and 2, the moving means 4 comprises a main element 14 that is cylindrical in shape and that is held against and guided in displacement along the elongate central body 12 of the carrier element 2, together with an abutment-forming retaining finger 15 extending perpendicularly to the main element 14, i.e. substantially parallel to the axis of rotation 6 of the hook 1; with the hook-securing member 22 being constituted as a single part that is itself in the form of a hook which is secured to one end of the mooring part 1, which comes against the central body 12 in the locking position, and which projects therefrom to enable the said finger 15 to engage therewith.

In a version of the device of the invention suitable for remote control, said cylindrically-shaped main body 14 could be an electrical or hydraulic actuator under remote control with an actuator rod that is extensible and retractable carrying said retaining abutment or finger 15.

Figure 4:
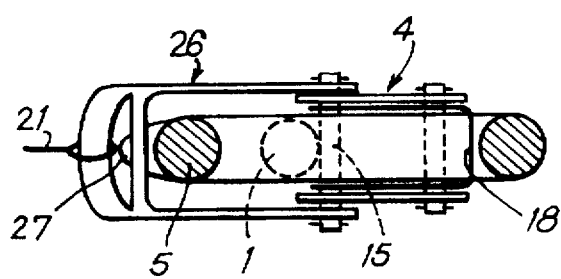
FIG. 4 is a fragmentary section view of the FIG. 3 device.
Figure 3A:
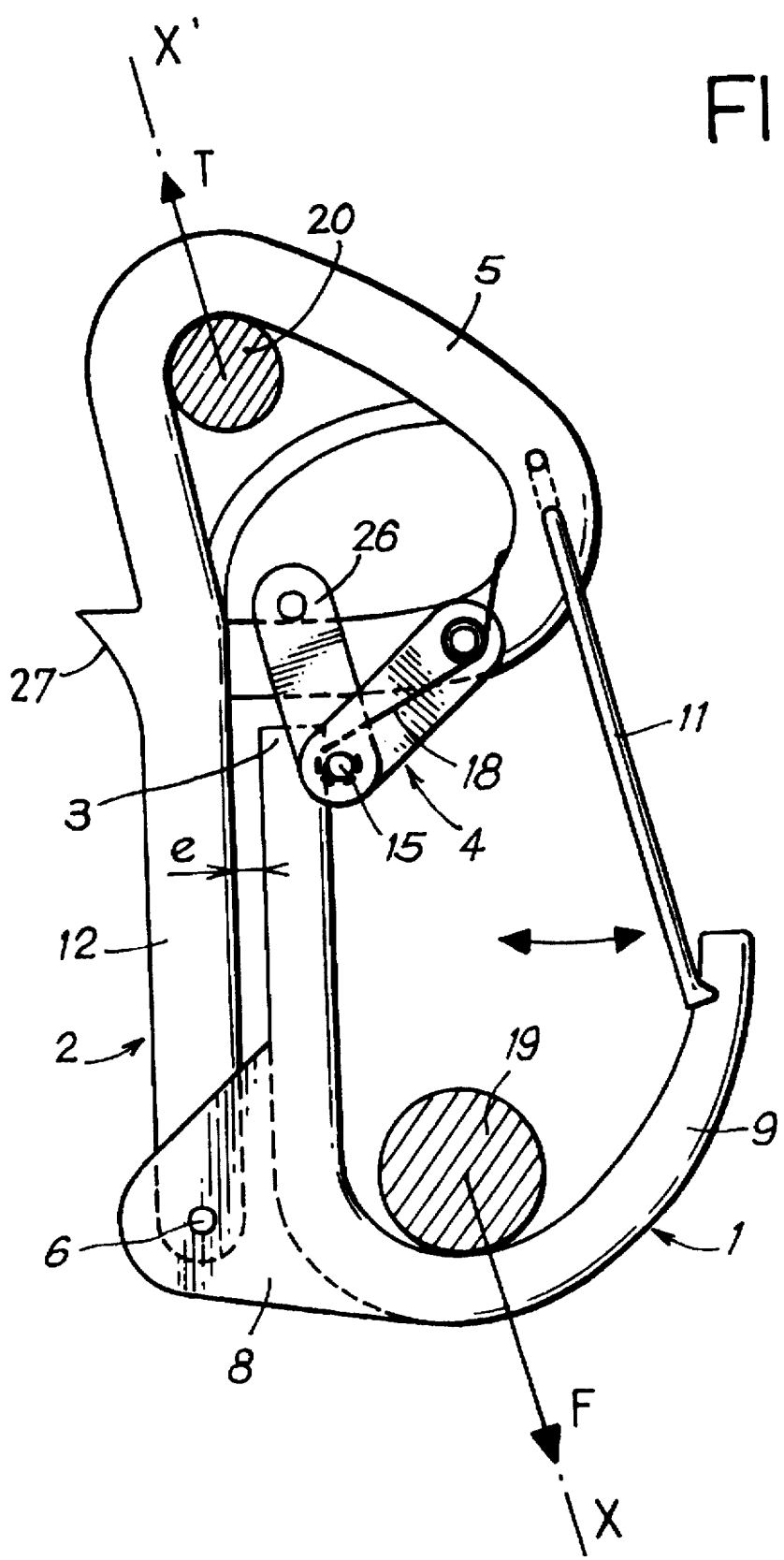
FIG. 3a is a profile view of the embodiment of FIG. 3 showing the clevis within the tractor ring.

In another embodiment, as shown in FIGS. 3 and 4, the hook 1 does not include a hook-securing member as in the preceding embodiment, and the moving locking means 4 is hinged on the traction ring 5 or on any other support secured thereto, and includes an abutment 15 that bears directly against the end 3 of the hook 1, thereby securing it in the locked position. The moving means 4 is disposed on the same side of the central body 12 of the carrier element 2 as said hook 1, and it includes a clevis 26 secured to said abutment 15 and itself bearing against any appropriate stop part 27 of the carrier element 2.

As shown in FIGS. 3 and 4, the clevis 26 may pass around the central body 12 of the carrier element 2 and the stop part 27 may be an abutment on the main body 12.

In another embodiment, as shown in dashed lines in FIG. 3, the clevis 26 may pass through the inside of the traction ring 5 or of a support secured thereto and optionally forming a second ring: the inside of this ring constitutes the stop part 27 against which the clevis comes to bear. If constituted directly by the traction ring 5, it may be necessary to provide a spacer or partition subdividing the inside of the ring 5 into two sub-rings so as to ensure that the traction element 20 cannot impede movement of the moving part 4 when it is desired to pull on the clevis 26 in order to disengage the abutment 15 for the end of the hook 3: such a spacer is shown in dashed lines in FIG. 3.

As shown in FIGS. 3 and 4, the moving means 4 is shown as comprising two hinged-together portions, namely the clevis 26 which is hinged on the abutment 15 and two links connecting said abutment 15 to an axis carried by the ring 5 and passing right through the body thereof; the clevis 26 itself surrounds the body 12 of the carrier element 2 as shown in FIG. 4 which is a simplified section on AA' of FIG. 3, or else it surrounds the branch of the ring 5 or the sub-ring that engages the body 12, as shown in dashed lines in FIG. 3.

In this embodiment, a resilient member 18 in the form of a hairpin has its base bearing against the inside of the traction ring 5 and surrounds the axis of rotation of the links of the moving means 4: thereafter, each of its two branches forms an S-shape with the ends thereof bearing against the axis forming the abutment 15 and on which the clevis 26 is hinged; this resilient element 18 thus forces the moving means 4 to remain in its maximally closed position bearing against the stop part 27.

In the embodiment of FIGS. 1 and 2, the resilient element 18 may be a helical spring surrounding the main element 14 of the moving means 4 and held in a compressed or tensioned state between one of the ends of the moving means 4 (being secured thereto by any appropriate washer or pin system) and one of the two bearings 13 secured to the main body 12 of the carrier element 2, and guiding said main element 14 thereof.

In a particular embodiment, said hook-retaining member 22 for retaining the hook 1 includes two symmetrical portions both of which are in the form of respective hooks, said portions surrounding and projecting beyond opposite sides of the central body 12 of the carrier element 2 to co-operate with the retaining abutment or finger 15 in the fastening position, which two portions are united by surrounding the end of the hook 1 to which they are secured.

In a version that is intended to be operable from the bow of a boat and using mechanical implementations that are simple like those shown in the figures, said moving means 4 includes, in addition to the resilient element 18, a fixing part 23 for fixing to a release member 21 on the same side as the traction ring 5. By applying traction to the release member, it is possible to disengage the abutment 15 for retaining the secured end 3 of the moving hook 1, and by releasing said member it is possible to return said abutment 15 into its locking position under drive from said resilient element 18, and this applies equally well to the embodiment of FIG. 3 and to the embodiment of FIGS. 1 and 2.

Said release member 21 may be fixed along the mooring or link element 20 and may be recovered by any operator holding the mooring 20.

To enable said hook 1 to be placed around the mooring part 19., the device of the invention includes a removable boathook pole 16 having one end that includes a notch 17 for securing the abutment that must then be included in the projecting axes such as the retaining fingers 15. The boathook pole is secured to the carrier element 2 by pulling, in operation, on the mooring line or link element 20 that is held in a pre-stressed state against said boathook pole 16; the hook is then held by the notch 17 against the retaining abutment 15 and it is held in place, for example, against the end 23 of the moving means 4 which receive the release member 21, as shown in FIG. 1. This disposition makes it possible to ensure that the hook 1 is securely retained by the boathook pole 16 and enables it to be pointed and moved in any direction 25, thus making it possible to fasten it under the best possible conditions.

Such a disposition of the characteristic elements of the invention, whichever embodiment is concerned, also ensures that the device withstands the traction force T as taken up by the mooring part 19 exerting a reaction force F: these two opposing forces T and F naturally tend to open the hook 1 by causing it to tilt about its axis 6 relative to the carrier element 2, and it is the end 3 of the hook 1, with or without the hook-securing member, that must provide sufficient strength to prevent any such opening by bearing against the retaining abutment 15.

The force E taken up by the end 3 of the hook and possibly also the hook-securing member 22 is nevertheless much smaller than the traction force proper T, since it benefits from a lever arm h relative to the axis of rotation 6 that is much greater than the lever arm d of the traction force.

Thus, by optimizing the device of the invention, by any conventional mechanical or strength of materials calculations, it is possible to obtain dimensions for the various parts and elements described above that are reasonable and easy to manufacture: the various parts may be manufactured separately and then welded together, or they may be made in the form of integral parts, e.g. by molding and/or forging, followed by machining.

In FIGS. 1 and 2, to ensure that the retaining finger 15 is held with greater security in the hooks 22 of the securing member 3, the hooks may be slightly curved in shape, curving back on themselves through more than 90°, and in the locking and traction position the end of the hook 1 situated against the main body 12 of the carrier element 2 must then be at a distance "e" therefrom which is compatible with the hook shape of the securing member 22. Such a disposition requires a greater force on the release member 21 to push away the curved hooks 22 in addition to the reaction force from the resilient element 18.

Indeed, this distance "e" is necessary to ensure that the device shown in FIG. 3 operates properly so as to enable the moving part 4 to pivot upwards by pushing back the end 3 of the hook against the central body 12 of the carrier element 2, so as to make it possible thereafter for the end 3 to be disengaged thus allowing the hook 1 to tilt while being released from the mooring part 19. In practice, this distance "e" should be equal to the diameter either of the central body of the carrier element 2, or else of the main body 9 of the hook 1.

Once the retaining finger 15 or abutment has been disengaged from the end 3 or from the securing member 22, the entire fastening hook 1 can tilt about the axis 6 because the reaction force F of the mooring part 32 is offset from said axis by the distance "d": the hook assembly 1 then pivots about the axis and disengages itself from the resilient closure element 11. The mooring part 19 continues to rub and/or push against the inside of the hook 1, thus opening it fully or at least until the traction T which continues to be exerted on the mooring 20 is in line with the direction xx', thereby enabling the mooring device of the invention to be completely disengaged from the part 19 without any manual intervention being necessary for that purpose.

I claim:

1. A remote and fast-acting fastening and release device comprising: a hook suitable for engaging a mooring part on which the device must be capable of fastening and from which it must be capable of releasing; a traction ring receiving a link element on which a traction force may be exerted in a traction direction, said hook being mounted to move about an axis perpendicular to the traction direction between an open position and a fastening position, and the axis being located at one end of a carrier element that carries the traction ring at its opposite end, the hook including a curved main body first end of which is closed, in the fastening position, by a tilting element, and a second end of which is situated adjacent to the carrier element in the fastening position, the curvature of the main body being such that in the fastening position, the force exerted by the mooring part on the hook in reaction to the traction force tends to open the hook by causing it to tilt about the axis, to move its second end away from the carrier element, which second end, in the fastening position is held by an abutment of a moving locking means generally stationary relative to the carrier element, which abutment in the fastening position exerts on the second end a force, having a moment about a locking means axis which compensates the moment of the reaction force from the mooring part, such that the hook while in the fastening position is held generally stationary against rotation, wherein the second end of said hook cooperates with the abutment in a manner such that when the abutment in the fastening position is activated by the moving means in the traction force direction, the abutment must urge the second end of the hook towards the carrier element in order to allow said second end to disengage and to allow the hook to tilt towards its open position, and wherein, when the device is in the fastening position, said second end of the hook is at a distance "e" from the carrier element, such that it is possible for the hook to move towards the carrier element and such that, so long as the moving means is not actuated such movement is not possible and said abutment is prevented from disengaging and wherein the moving locking means is hinged beneath the traction ring and includes the abutment that comes to bear against the end of the hook which it secures in a locking position, and disposed on the same side of the central body of the carrier element as said hook, which moving means includes a clevis secured to said abutment and itself coming to bear against a part of the carrier element.

2. A fastening and release device according to claim 1, wherein the carrier element comprises a single metal rod of substantially cylindrical section whose middle portion is rectilinear and constitutes an elongate central body with a curved first end thereof forming the traction ring and with the other end thereof supporting a hinge axis.

3. A fastening and release device according to claim 1, wherein said hook includes a supporting fork that is secured to the main body thereof and that carries said axis enabling the hook to rotate relative to the carrier element.

4. A fastening and release device according to claim 1, wherein said moving means includes a resilient member and a fixing part for fixing to a release member adjacent to the traction ring, which release member makes it possible, when traction is applied thereto, to disengage the abutment retaining the second end of the moving hook, and by such release enables the said abutment to be returned to a locking position by said resilient member.

5. A fastening and release device according to claim 1, including a removable boathook pole having an end which includes a notch for securing a retaining abutment.

* * * * *